United States Patent
Huang et al.

(10) Patent No.: US 10,942,963 B1
(45) Date of Patent: Mar. 9, 2021

(54) METHOD AND SYSTEM FOR GENERATING TOPIC NAMES FOR GROUPS OF TERMS

(71) Applicants: Bei Huang, Mountain View, CA (US); Nhung Ho, Redwood City, CA (US); Meng Chen, Mountain View, CA (US)

(72) Inventors: Bei Huang, Mountain View, CA (US); Nhung Ho, Redwood City, CA (US); Meng Chen, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 399 days.

(21) Appl. No.: 15/946,400

(22) Filed: Apr. 5, 2018

(51) Int. Cl.
*G06F 16/00* (2019.01)
*G06F 16/35* (2019.01)
*G06N 5/02* (2006.01)
*G06F 16/31* (2019.01)

(52) U.S. Cl.
CPC .......... *G06F 16/355* (2019.01); *G06F 16/313* (2019.01); *G06N 5/02* (2013.01)

(58) Field of Classification Search
CPC ...... G06F 16/355; G06F 16/313; G06F 16/35; G06F 16/285; G06N 5/02
See application file for complete search history.

(56) References Cited

U.S. PATENT DOCUMENTS

| | | | | |
|---|---|---|---|---|
| 10,095,771 | B1* | 10/2018 | Dykstra | G06F 16/951 |
| 10,152,549 | B1* | 12/2018 | Vanderwater | G06Q 50/01 |
| 2005/0159835 | A1* | 7/2005 | Yamada | G06Q 10/06 700/109 |
| 2008/0091690 | A1* | 4/2008 | Ellersick | G06F 8/10 |
| 2009/0228452 | A1* | 9/2009 | Zhang | G06F 16/313 |
| 2011/0173216 | A1* | 7/2011 | Newman | G06F 16/972 707/765 |
| 2012/0284593 | A1* | 11/2012 | Rodriguez | H05B 47/12 715/201 |
| 2013/0006995 | A1* | 1/2013 | Toke-Nichols | G06F 16/355 707/738 |
| 2013/0297612 | A1* | 11/2013 | Ravid | G06N 20/00 707/740 |
| 2014/0344718 | A1* | 11/2014 | Rapaport | H04L 51/32 715/753 |

(Continued)

OTHER PUBLICATIONS

Liu, J. et al., "Mining Quality Phrases from Massive Text Corpora", Proceedings of the 2015 ACM SIGMOD (SIGMOD 15) International Conference on Management of Data, Melbourne, Victoria, Australia, May 31-Jun. 4, 2015, pp. 1729-1744 (16 pages).

*Primary Examiner* — Noosha Arjomandi
(74) *Attorney, Agent, or Firm* — Ferguson Braswell Fraser Kubasta PC

(57) ABSTRACT

The invention relates to a method for generating a topic name for accounts grouped under a topic. The method includes obtaining account names associated with the accounts, generating a plurality of n-grams from the account names, and for each n-gram, obtaining a quality score based on relevance and meaningfulness of the n-gram. The relevance is determined using at least one relevance score that reflects how representative the n-gram is for the plurality of n-grams, and the meaningfulness is determined based on whether the n-gram exists in a knowledge base. The method further includes assigning one or more of the n-grams to the topic as the topic name, based on the quality score generated for each of the n-grams.

23 Claims, 8 Drawing Sheets

(56) References Cited

U.S. PATENT DOCUMENTS

| | | | |
|---|---|---|---|
| 2016/0125087 A1* | 5/2016 | Mallah | G06F 16/90332 |
| | | | 705/14.54 |
| 2016/0125462 A1* | 5/2016 | Mallah | G06F 16/285 |
| | | | 705/14.54 |
| 2016/0142787 A1* | 5/2016 | Mohamed | H04L 63/0861 |
| | | | 725/53 |
| 2016/0292583 A1* | 10/2016 | Browning | H04L 43/045 |
| 2017/0017721 A1* | 1/2017 | Sauper | G06F 16/248 |
| 2017/0109433 A1* | 4/2017 | Zomet | G06F 40/232 |
| 2017/0270416 A1* | 9/2017 | Sri | G06Q 30/00 |
| 2017/0316383 A1* | 11/2017 | Naganathan | G06Q 10/1095 |
| 2018/0121430 A1* | 5/2018 | Kagoshima | G06F 16/951 |
| 2018/0204111 A1* | 7/2018 | Zadeh | G06K 9/3233 |
| 2018/0246899 A1* | 8/2018 | Natchu | G06F 16/93 |
| 2018/0246973 A1* | 8/2018 | Zhao | G06F 16/9535 |
| 2018/0246974 A1* | 8/2018 | Shukla | G06F 16/9535 |
| 2018/0253496 A1* | 9/2018 | Natchu | H04L 67/02 |
| 2018/0375816 A1* | 12/2018 | Sharifi | G08B 5/222 |
| 2019/0147103 A1* | 5/2019 | Bhowan | G06F 16/353 |
| | | | 707/737 |
| 2019/0155961 A1* | 5/2019 | Alonso | G06F 16/284 |
| 2019/0347688 A1* | 11/2019 | Shariff | G06Q 30/0244 |

\* cited by examiner

Exemplary Scenario 200

Topic 210

| Account Names 220 | |
|---|---|
| expense | moving |
| office | misc |
| telephone | prepaid |
| supplies | personal |
| internet | software |
| payroll | travel |
| general | miscellaneous |
| automobile | medical |
| administrative | rent |

Topics Name Candidates 230 office supplies
payroll expenses
automobile expense
office expenses
telephone expense
auto expense
office general administrative expenses
rent expense
office expense

Related Terms in Knowledge Base 240 office expenses    telephone costs    moving expenses
administrative costs    payroll

*FIG. 2*

METHOD AND SYSTEM FOR GENERATING TOPIC NAMES FOR GROUPS OF TERMS

BACKGROUND

Terms used in certain domains may be grouped in a meaningful manner to provide structure to these terms. For example, scientific terms may be grouped based on scientific disciplines, financial accounts may be grouped based on their purpose, e.g., to separate accounts used for paying salaries from accounts used for paying taxes, etc. Each group of terms may form a topic, and each topic may receive a topic name to facilitate identification.

SUMMARY

In general, in one aspect, one or more embodiments relate to a method for generating a topic name for accounts grouped under a topic, the method comprising obtaining account names associated with the accounts; generating a plurality of n-grams from the account names; and for each n-gram, generating a quality score based on relevance and meaningfulness of the n-gram. The relevance is determined using at least one relevance score that reflects how representative the n-gram is for the plurality of n-grams, and the meaningfulness is determined based on whether the n-gram exists in a knowledge base. The method further comprises assigning one or more of the n-grams to the topic as the topic name, based on the quality score generated for each of the plurality of n-grams.

In general, in one aspect, one or more embodiments relate to a system for generating a topic name for accounts grouped under a topic, the system comprising an account repository storing the accounts; an account identification repository storing account names associated with the accounts; a hardware processor and memory; and software instructions stored in the memory, which when executed by the hardware processor, cause the hardware processor to obtain the account names associated with the accounts from the account identification repository; generate a plurality of n-grams from the account names; and for each n-gram, generate a quality score based on relevance and meaningfulness of the n-gram. The relevance is determined using at least one relevance score that reflects how representative the n-gram is for the plurality of n-grams, and the meaningfulness is determined based on whether the n-gram exists in a knowledge base. The software instructions further cause the hardware processor to assign one or more of the n-grams to the topic as the topic name, based on the quality score generated for each of the plurality of n-grams.

In general, in one aspect, one or more embodiments relate to a non-transitory computer readable medium including computer readable program code for causing a computer system to obtain account names associated with accounts that are grouped under a topic; generate a plurality of n-grams from the account names; and for each n-gram, generate a quality score based on relevance and meaningfulness of the n-gram. The relevance is determined using at least one relevance score that reflects how representative the n-gram is for the plurality of n-grams, and the meaningfulness is determined based on whether the n-gram exists in a knowledge base. The computer readable program code further causes the computer system to assign one or more of the n-grams to the topic as the topic name, based on the quality score generated for each of the plurality of n-grams.

Other aspects of the invention will be apparent from the following description and the appended claims.

BRIEF DESCRIPTION OF DRAWINGS

FIG. 2 shows an example in accordance with one or more embodiments of the invention.

DETAILED DESCRIPTION

Figure 1A:
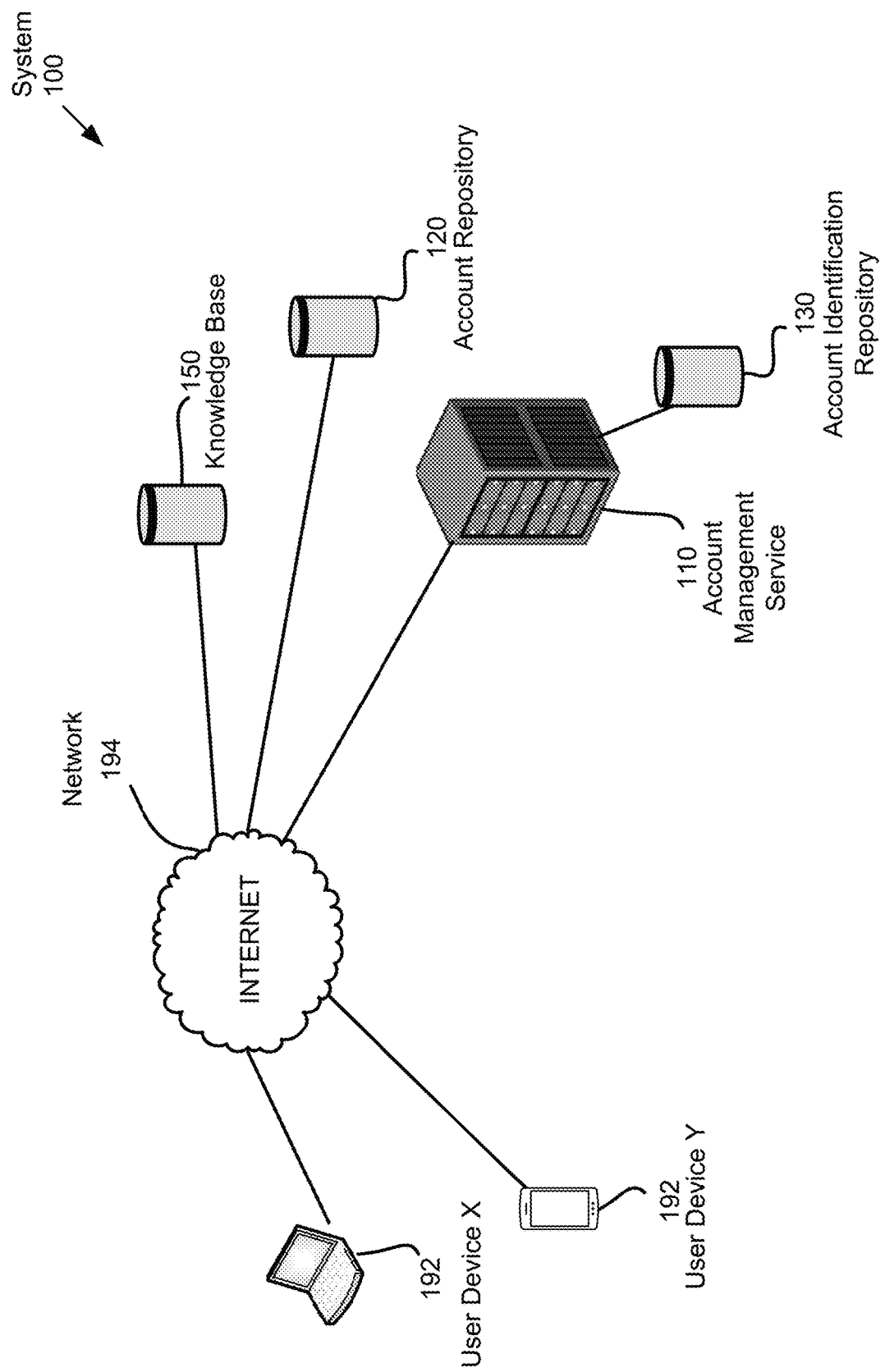
FIGS. 1A and 1B show systems for generating topic names for topics based on terms grouped under the topics, in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the invention, the various disclosed embodiments may be combined in virtually any manner. All combinations are contemplated herein.

In general, embodiments of the present disclosure provide a method and a system for generating topic names for groups of terms. Topics that define the groups may be introduced to add structure in situations in which numerous terms are used. These terms may relate to a particular discipline or domain, e.g., accounting, law, finance, or the like. Consider, for example, a corporate organization that uses many accounts to conduct its business. Each of these accounts may serve a specific purpose may exist and may be named accordingly. An account dedicated to payroll payments, an account dedicated to tax payments, another account dedicated to utility payments, etc. Numerous such accounts may be listed in the chart of accounts, and identifying accounts may be challenging if no further structure is provided. Further complicating the identification of particular accounts, frequently, the naming of accounts may not follow established naming conventions, especially in smaller organizations which may not rely on accounting professionals to manage their accounts.

Accounts in accordance with one or more embodiments of the disclosure may be grouped based on their purpose, expressed by their account names. For example, the accounts "telephone", "internet" and "supplies" may be assigned to a group or topic that is specific to office expenses, thereby providing a meaningful grouping. In one or more embodiments of the present disclosure, a topic name is assigned to each topic. Determining the topic name in accordance with one or more embodiments of the present disclosure requires no or little involvement by a human expert. More specifically, the topic names may be determined by the subsequently described embodiments, based on at least two criteria. The first criterion is that a topic name, in accordance with an embodiment of the present disclosure, is required to be relevant. Relevance of a topic name may be determined based on how representative a selected topic name is for the account names that are included in the topic. The second criterion is that a topic name, in accordance with an embodiment of the present disclosure, is required to be meaningful. Meaningfulness of a topic name may be assessed in view of a knowledge base, i.e., a body of content that is deemed related to the topic to be named. The knowledge base is considered reliable, and it may therefore be assumed that a candidate topic name that is found in the knowledge base is meaningful. Accordingly, one may consider a candidate topic name to be meaningful, if candidate topic name can be located in the knowledge base. However, as further discussed below with reference to the methods described in FIGS. 3, 4, and 5, the mere fact that a candidate topic name does not appear in the knowledge base does not automatically imply that the candidate topic name is not meaningful, for example, because the knowledge base may be incomplete (i.e., missing a meaningful term). Accordingly, meaningfulness as used in one or more embodiments of the disclosure is statistically adjusted for the possibility of an incomplete knowledge base. Based on relevance and meaningfulness, the quality of candidate topic names is assessed, in accordance with one or more embodiments of the present disclosure. The highest quality candidate topic name may then be made the topic name.

The assignment of a topic name may be performed as further described below. While the subsequent discussion is directed to applications in the domain of accounting, those skilled in the art will appreciate that the assignment of topic names is not specific to accounting. Embodiments of the present disclosure are applicable wherever terms are grouped, and where one wants to identify meaningful names for the groups of terms.

Figure 1B:
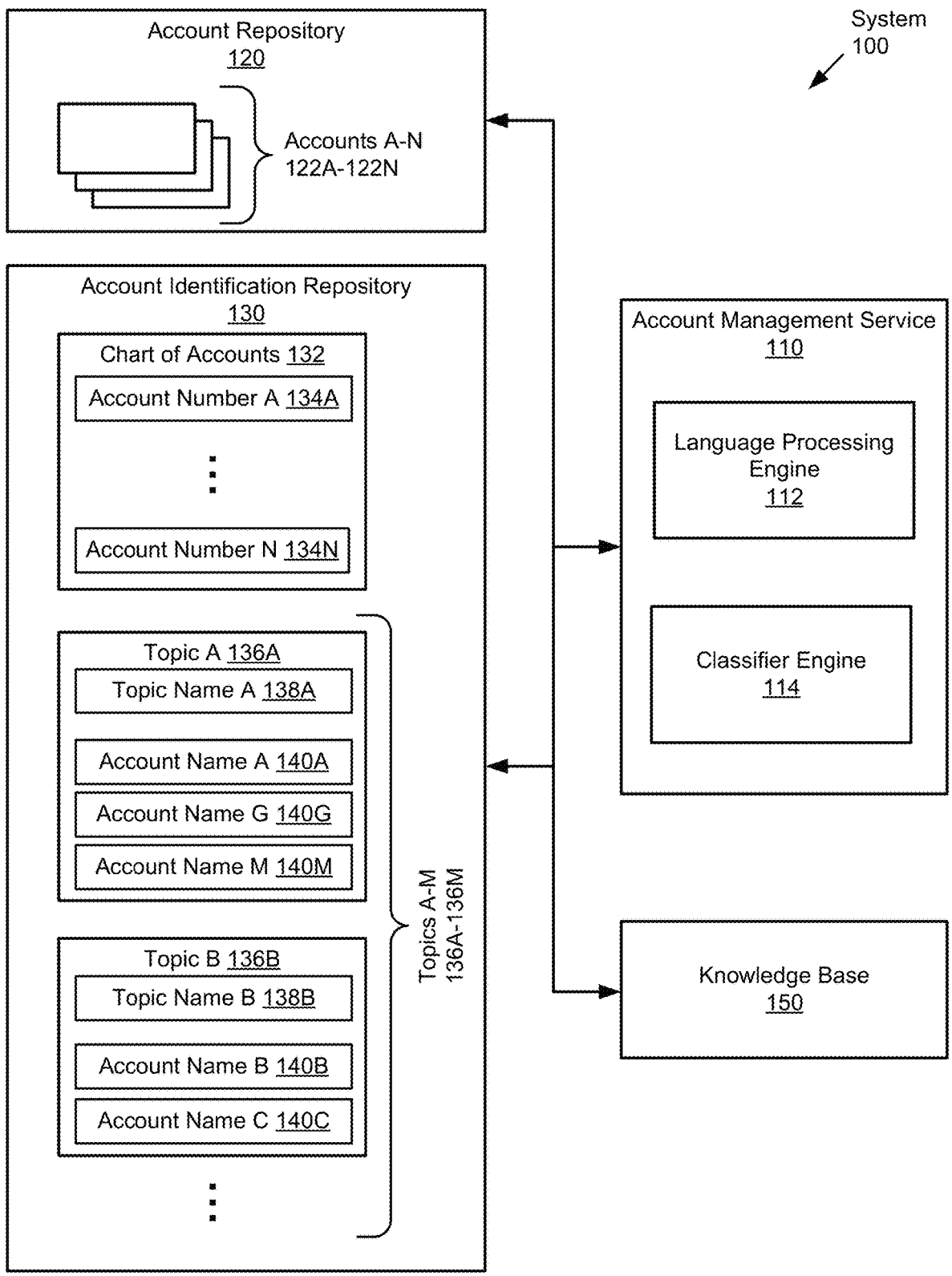

Turning to FIGS. 1A and 1B, a system for generating topic names for topics based on terms grouped under these topics, in accordance with one or more embodiments of the present disclosure, is shown. The system (100) may include an account management service (110), an account repository (120), an account identification repository (130), a knowledge base (150), user devices (192) and a network (194). Each of these components is described below. As previously noted, embodiments of the present disclosure are equally applicable to domains that are not accounting-related. Accordingly, a generalized system may include a topic management service rather than the account management service (110); a user data repository rather than the account repository (120); and a user data identification repository rather than the account identification repository (130).

Turning to FIG. 1A, the account management service (110), in accordance with one or more embodiments of the present disclosure, includes a set of machine-readable instructions (stored on a computer-readable medium) which, when executed by the account management service (110) generate topic names for topics based on terms grouped under these topics. A detailed description of the operations performed by the account management service (110) is provided in the flowcharts of FIGS. 3, 4 and 5. A description of the architecture of the account management service (110) is provided in FIG. 1B.

The account repository (120), in accordance with one or more embodiments of the present disclosure, stores accounts (122A-122N in FIG. 1B) such as financial accounts. The account repository is used to track and document transactions associated with these accounts. The database used for the account repository (120) may be implemented using any format suitable for the storage of accounts. The account repository (120) may be operated by an entity separate from the organization that operates the account management system (110). For example, the account repository (120) may be operated by a financial institution, whereas the account management system (110) may be operated by the account holder or by a third-party accounting service provider.

The account identification repository (130), in accordance with one or more embodiments of the present disclosure, is used to name the accounts stored in the account repository (120), which may be beneficial for the purpose of organizing and administrating these accounts, e.g., based on the account names. The account identification repository (130) is described in detail with reference to FIG. 1B. The database used for the account identification repository may be implemented using any format suitable for the storing and organizing account names. The account identification repository (130) may be stored in non-volatile or volatile memory, e.g. on a hard disk drive or in Random Access Memory (RAM).

The knowledge base (150), in accordance with one or more embodiments of the present disclosure, serves as a trusted corpus that is relied upon for the purpose of identifying a meaningful topic name based on the account names that are stored under the topic to be named. The knowledge base (150) may contain terminology that is based on expert knowledge or that is widely accepted, and that is related to the topic to be named. For example, in an accounting domain, the knowledge base may be a quality corpus related to accounting and may be provided in the form of an accounting wiki-page, a dictionary of accounting terms, an article about accounting, an accounting product review page or any other accounting terminology source deemed trustworthy. If the system (100) is used for generating topic names in non-accounting domains, the knowledge base may be selected accordingly. For example, if the terms for which a topic name is to be found are scientific terms, the knowledge base may be a scientific database. The knowledge base may be implemented in a format suitable for the storage of the knowledge base content. For example, the knowledge base may be a text document, a spreadsheet, a database, a web page, etc. The knowledge base (150) may be operated by an entity separate from the organization that operates the account management system (110). For example, the knowledge base may be a Wikipedia page. In one or more embodiments of the present disclosure, the knowledge base (150) is established using information gathered from expert users. These expert users may be assumed to use terminology in a desirable and consistent manner. The knowledge base may be, for example, an accounting solution operated only by or primarily by accounting experts. Accordingly, the knowledge base may contain accounting terms that properly categorize certain transactions. For example, the accounting expert may have established the term "office expense" for expenses such as paper, telephone, etc., whereas a non-expert may have directly generated accounts named "paper", "telephone", etc. If such a knowledge base is maintained (e.g., by actively using the accounting solution used as the knowledge base), the knowledge base may be considered a dynamic resource that updates as new terms become available.

The user devices (192), in accordance with one or more embodiments of the present disclosure, enable users to access the system (100). A user may access the system to perform accounting tasks such as financial transactions. Further, a user may access the system to administrate and manage the accounts, to obtain business insights, to perform auditing tasks, to prepare tax filings, to group inventory, to organize collections of technological or scientific terms, etc. In one embodiment of the present disclosure, a user may benefit from the availability of topic names serving as an indication for the accounts stored under the associated topics. A user device may be any type of a computing device, e.g., a non-portable or portable device. An exemplary computing device is described below with reference to FIGS. 7A and 7B.

The components of the system (100), i.e., the account management service (110), the account repository (120), the account identification repository (130) and the user devices (192) may communicate using any combination of wired and/or wireless communication protocols via a network (194). In one embodiment of the present disclosure, some or all of these components communicate via a wide area network (e.g., over the Internet), and/or a local area network (e.g., an enterprise or home network). The communication between these components may include any combination of secured (e.g., encrypted) and non-secured (e.g., un-encrypted) communication. The manner in which these components communicate may vary based on the implementation of the present disclosure.

Turning to FIG. 1B, additional aspects of the system (100) are described.

In one embodiment of the present disclosure, the account management service (110) includes a language processing engine (112) and a classifier engine (114). The language processing engine (112) may perform various functions such as the generation of n-grams from account names, the scraping of text from the knowledge base, etc. These functions are described with reference to FIGS. 3-5. The classifier engine (114) may be involved in identifying, from the n-grams, an n-gram that qualifies as a topic name, in view of the knowledge base. The role of the classifier engine is further described with reference to FIGS. 3-5.

In one or more embodiments of the present disclosure, the account identification repository (130) includes a chart of accounts (132). The chart of accounts (132) may be a listing of accounts used by the organization that uses the system (100). The chart may be sorted by account numbers (134A-134N) of the accounts (122A-122N). The chart of accounts (132) does not necessarily identify an account by an account name. The chart of accounts, thus, primarily enables the identification of an account by its account number.

In one or more embodiments of the present disclosure, the account identification repository (130) includes topics. For the exemplary account identification repository (130), only topics A and B (136A, 136B) are shown. However, any number of topics (136A-136M) may be established depending on how the accounts A-N (122A-122N) are assigned to topics. An account is identified as a member of a topic using the account's account name. In the exemplary account identification repository (130), Account name A (140A) associated with account A (122A) is assigned to topic A (136A). Similarly, accounts G and M (122G, 122M) are also assigned to topic A (136A) using their account names (140G, 140M). Accounts B and C (122B, 122C) are assigned to topic B (136B) using their account names (140B, 140C).

Figure 7A:
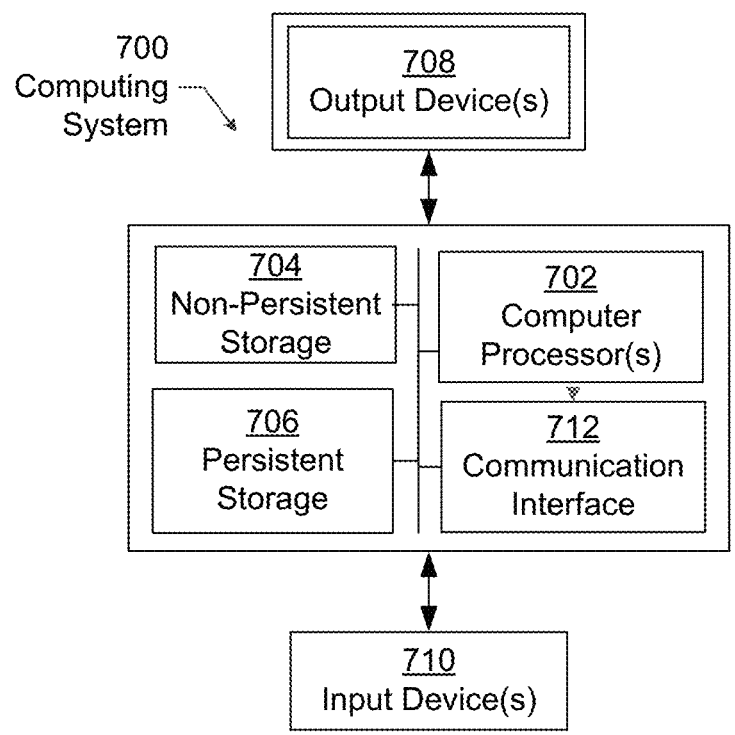
FIGS. 7A and 7B show computing systems in accordance with one or more embodiments of the invention.
Figure 7B:
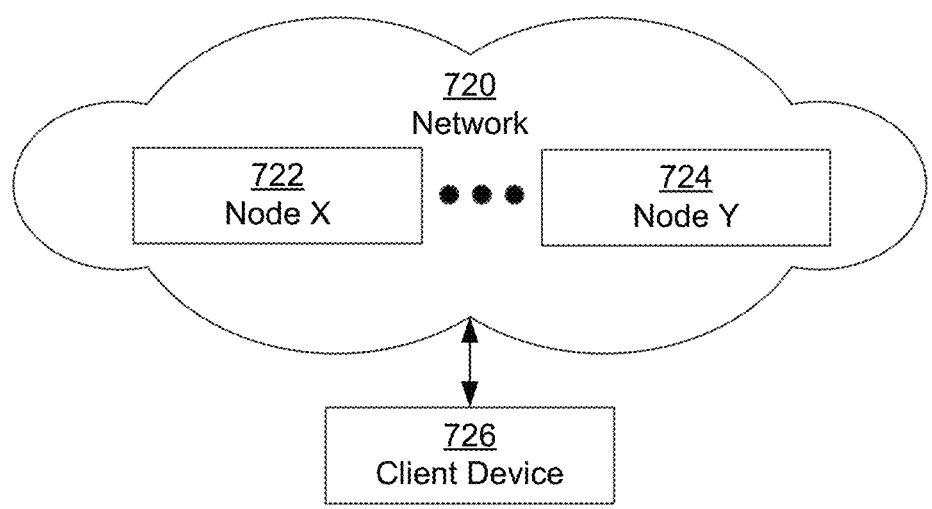

Embodiments of the present disclosure may be implemented on one or more computing systems that may be similar to the computing system introduced in FIGS. 7A and 7B.

While FIGS. 1A and 1B show configurations of components, other configurations may be used without departing from the scope of the present disclosure. For example, various components may be combined to create a single component. As another example, the functionality performed by a single component may be performed by two or more components that may be communicatively connected using a network connection.

Turning to FIG. 2, an example (200) is shown. The example includes a topic (210) under which account names (220) are grouped. The example further includes a set of topic name candidates (230). For the purpose of the subsequent discussion, assume that these topic name candidates are purely hypothetical. The example also includes a knowledge base (240) for which terms that are related to the account names (220) have been identified.

As previously noted, a quality topic name, in accordance with one or more embodiments of the present disclosure, is required to be relevant and meaningful as compared to other topic names or based on information related to the topic name. Relevance and meaningfulness are subsequently discussed.

Relevance relates to a selected topic name being representative for all or a majority of the account names (220). Consider the account names (220). These account names (220) appear to relate to a broad range of different expenses. For example, some account names such as "telephone", "supplies", "internet", etc. appear to be related to office expenses. Other account names such as "automobile", "travel", "medical", etc. appear to be related to other expense categories. Accordingly, a relevant topic name would have to be relatively broad in order to cover these different expense categories. Consider, for example, the topic name candidate "office expenses". While this topic name would cover "telephone", "supplies" and "internet", it does not cover "automobile", "travel" and "medical". Accordingly, the topic name candidate "office expenses", is relevant for multiple but not all account names. Because, in the example, the account names (220) relate to a broad spectrum of different expenses, it may be necessary to pick a broad term such as "expense" to ensure relevance for all account names (220).

Meaningfulness relates to a selected topic name existing in the selected knowledge base, as previously established. In the example, various account names (220) may be found in the knowledge base (240). For example, the account names "expense", "office", "telephone", "moving", "administrative" and payroll can be found in the knowledge base (240). Accordingly, these account names, in the example, are considered meaningful topic name candidates. In contrast, other account names, e.g., "internet", "rent", "misc.", etc. do not exist in the knowledge base (240) and are therefore not meaningful topic name candidates.

A review of the resulting meaningful and relevant topic name candidates indicates that only the term "expense" satisfies both the meaningfulness and relevance criteria. Accordingly, the term "expense" may be selected as the topic name for the topic (210). Note that the selected topic name "expense" is relatively broad because the account names associated with the topic are cover different expense categories. Assume, hypothetically, that in another scenario, the account names included only terms that are related to office expenses only (e.g., "office", "telephone", "supplies", "internet", etc.). In this alternative scenario, the term "office expense" would be an appropriate topic name because it satisfies both the meaningfulness and relevance criteria.

Figure 3:
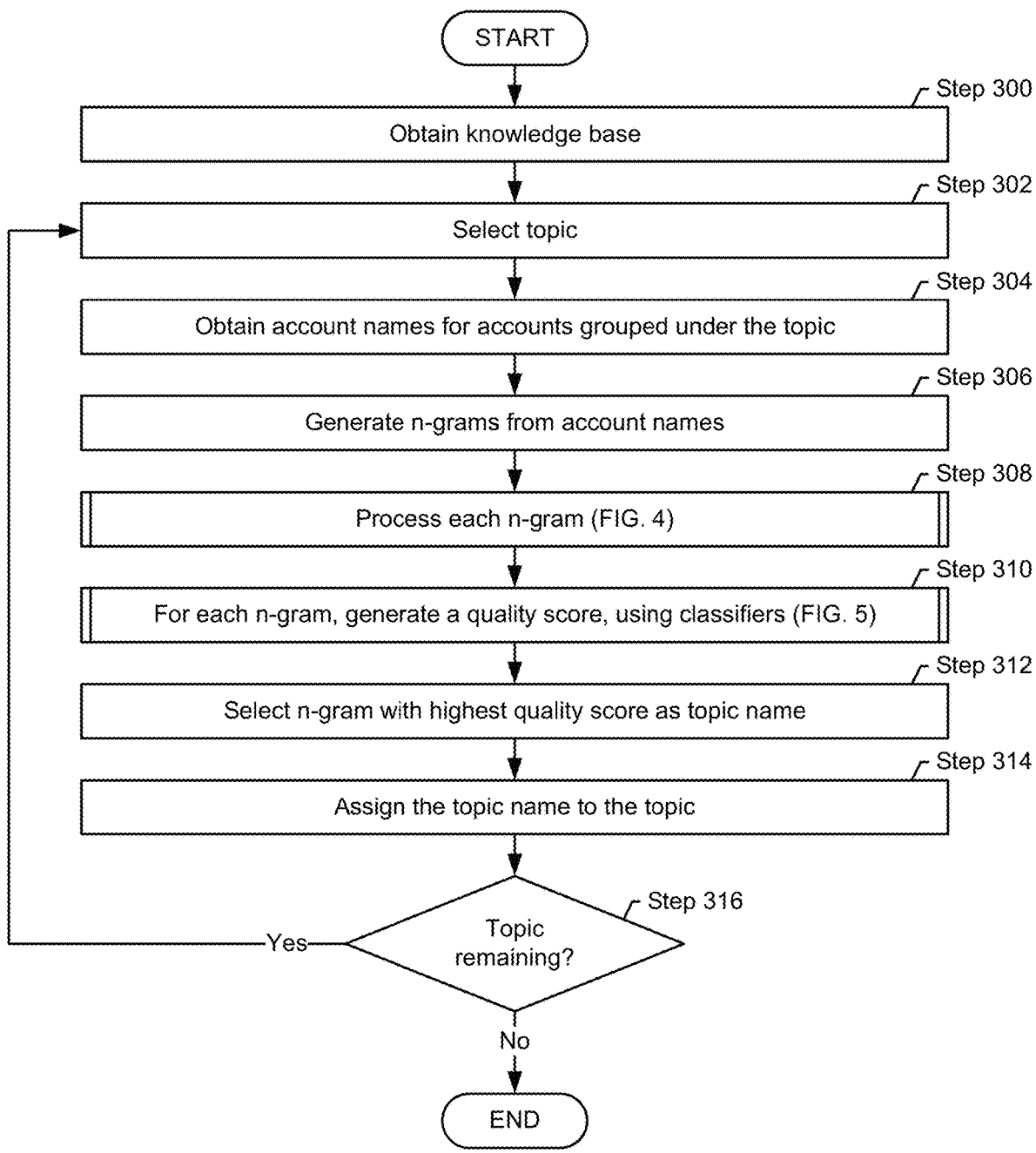
FIGS. 3, 4, and 5 show flowcharts in accordance with one or more embodiments of the invention.
Figure 4:
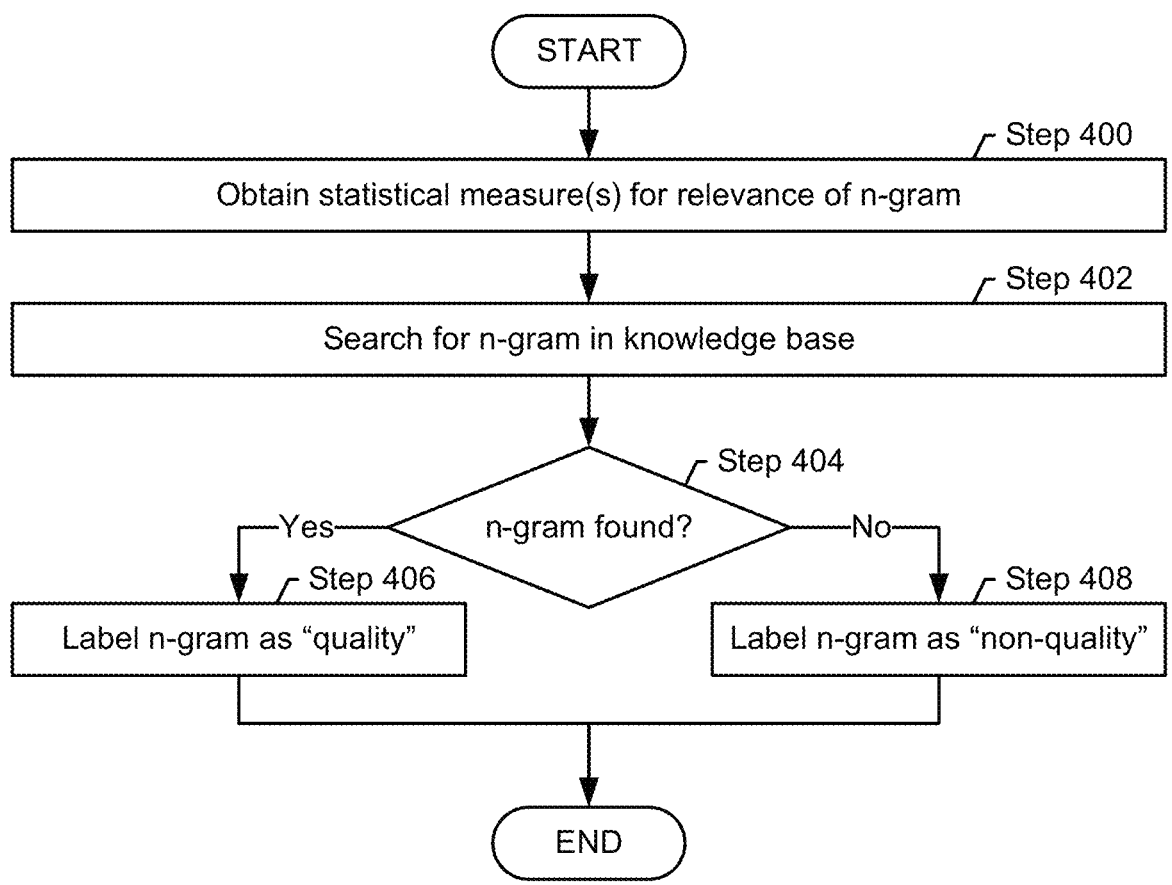
Figure 5:
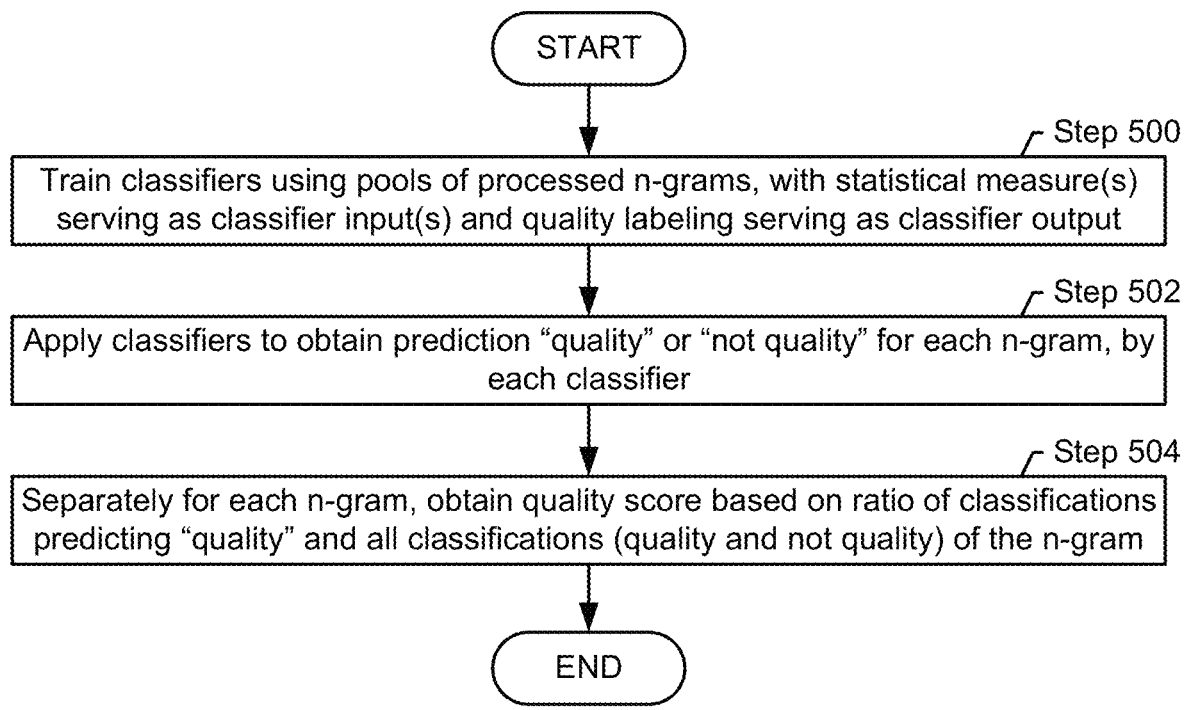

FIGS. 3-5 show flowcharts in accordance with one or more embodiments of the present disclosure. While the various steps in these flowcharts are provided and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the present disclosure. By way of an example, determination steps may not require a processor to process an instruction unless an interrupt is received to signify that condition exists in accordance with one or more embodiments of the present disclosure. As another example, determination steps may be performed by performing a test, such as checking a data value to test whether the value is consistent with the tested condition in accordance with one or more embodiments of the present disclosure.

Turning to FIG. 3, a method for generating topic names for topics based on terms (e.g., account names) grouped under the topics, is described. The method may be used to generate topic names for topics and may be executed whenever a new topic with a set of account names assigned to the topic becomes available. The method may further be executed whenever the account names under a topic change, e.g., when an account name is added or removed to/from the topic.

In Step 300, a knowledge base is obtained. Depending on the nature of the knowledge base, obtaining the knowledge base may involve different steps. For example, accessing a knowledge base that is provided as a text document may require steps different from accessing a knowledge base that is available as a webpage. Additional processing such as segmenting the content of the knowledge base into phrases, stemming, the removal of stop words and/or other commonly used operations of natural language processing may be performed to make the content accessible for the execution of subsequently described steps.

In Step 302, a topic to be processed in the subsequent steps is selected, and in Step 304, the account names that are grouped under the topic are obtained.

In Step 306, n-grams are generated from the account names. The n-grams may be groups of successive words in the account names, such as unigrams, bigrams, trigrams, etc., depending on the selected configuration. Consider, for example, the account name "Steve's auto expenses: blue Ford Taurus 2018". The resulting trigrams would be "Steve's auto expenses", "auto expenses blue", "expenses blue Ford", "blue Ford Taurus" and "Ford Taurus 2018". Additional processing such as stemming, the removal of stop words and/or other commonly used operations of natural language processing may be performed on the account names. After completion of Step 306, n-grams may be available for all account names grouped under the selected topic.

In Step 308, each of the n-grams is processed as described below with reference to FIG. 4. After the execution of Step 308, each of the n-grams may have been analyzed for its statistical relevance, and further for each of the n-grams it is known whether it exists in the knowledge base. In one or more embodiments of the present disclosure, an n-gram that exists in the knowledge base is labeled as "quality", whereas an n-gram that does not exist in the knowledge base is labeled as "non-quality", based on the underlying assumption that the knowledge base includes at least some quality terms, i.e., terms that are considered relevant to the topic that is currently being processed.

In Step 310, a quality score is generated for each of the n-grams, as described below with reference to FIG. 5. The quality score, in accordance with one or more embodiments of the present disclosure, rates the likeliness that the n-gram is a good choice as a name for the topic, under consideration of the statistical relevance obtained in Step 308, and under consideration of the content of the knowledge base. The quality score, thus, expresses relevance and meaningfulness of the n-gram. The quality score may be provided in a set range, e.g., in a range from 0 to 1, with "0" indicating lowest quality and "1" indicating highest quality.

In Step 312, the n-gram with the highest quality score is selected as the topic name. Alternatively, multiple n-grams with quality scores above a set threshold, or a set number of top-scoring n-grams may be selected.

In Step 314, the selected topic name is assigned to the topic.

In Step 316, a determination is made about whether a topic is remaining. If a topic is remaining, the execution of the method may return to Step 302 to process the remaining topic. If no topic is remaining, the execution of the method may terminate.

Turning to FIG. 4, a method for processing an n-gram, is described.

In Step 400, one or more statistical measures for the relevance of the n-gram are obtained using, for example, one or more of the subsequently described tests (i)-(iv). Each of these statistical measures may be associated with a score. More specifically, in Step 400, an n-gram is analyzed for its relevance to the topic. Some or all of the following tests may be performed on the n-gram:

(i) Frequency: The frequency of the n-gram among all n-grams obtained for the topic may be analyzed. A higher frequency may indicate a higher relevance. For example, if the unigram "automobile" is detected ten times, whereas the unigram "insurance" is detected only once, the unigram "automobile" is assumed to be highly relevant in comparison to the unigram "insurance". The frequency may be obtained as a raw frequency such as 23 occurrences per 943 n-grams or may be scaled to fit into a particular range, e.g., 0-1.

(ii) Term Frequency-Inverse Document Frequency (TF-IDF): The frequency of the n-gram among all n-grams obtained for the topic may be weighted by the general frequency of the n-gram (e.g., based on the occurrence of the n-gram in other topics, in the knowledge base, or elsewhere). This may reduce the likeliness of an inadvertent consideration of frequently occurring stop words as highly relevant. Similar to the previously discussed frequency, the TD-IDF may be provided as a raw frequency or scaled to a desired range.

(iii) Mutual Information: The mutual information may be obtained to assess the degree of information that a selected n-gram provides about the body of n-grams obtained for the topic. A higher mutual information, in this information-theoretical approach, may indicate that the analyzed n-gram is more representative for the body of n-grams than a lower mutual information.

(iv) Other statistics may be relied upon, without departing from the present disclosure. Such statistics may be based on or build on regularized term frequency, cosine similarity using word2vec or sent2vec algorithms, bag of words models, skip-gram models, etc.

Each of the performed statistical tests may provide a score that indicates the relevance of the analyzed n-gram, based on the performed statistical test.

In Step 402, a search for the n-gram is performed in the knowledge base, and in Step 404, a determination is made about whether the n-gram has been found in the knowledge base. If the n-gram has been found, it is labeled as "found". If the n-gram has not been found, it is labeled as "not found". N-grams labeled as "found" are considered more likely to be meaningful labels for a topic in comparison to n-grams labeled as "not found", based on their presence or absence, respectively, in the knowledge base.

Turning to FIG. 5, a method for obtaining a quality score for an n-gram is described.

In Step 500, a set of classifiers is trained. The classifiers may use, for example, logistic regressions, random forests, gradient boost machines, etc. The X-matrix used for the training of the classifier, may include the statistical measures for the n-grams that have been obtained as previously described (Step 400). In one embodiment of the present disclosure, the statistical measures are weighted, e.g., by a multiplicative gain. The Y-vector used for the training of the classifier may use ground-truth classification data based on the found/not found classifications that were previously obtained (Steps 402-408).

In one or more embodiments of the present disclosure, the found/not found classifications (Steps 402-408) are noisy because actual quality n-grams may have been erroneously labeled as "non-quality" because the n-grams were not present in the knowledge base, despite being meaningful. To reduce the effect of the noisy classifications, a set of classifiers, rather than a single classifier, may be trained. Each classifier may be trained based on a subset of K n-grams, drawn randomly with replacement from the n-grams labeled "quality" and a subset of K n-grams drawn randomly with replacement from the n-grams labeled "non-quality". These subsets may be combined to form a perturbed training set which may be used for training the classifier. The process of identifying subsets and training based on the subsets may be repeated T times.

In Step 502, each of the obtained T classifiers is applied to each n-gram, resulting in a set of T "quality"/"non-quality" predictions for each n-gram. More specifically, each of the classifiers obtained in Step 500 is provided with the pre-defined statistical measures associated with the n-gram to receive a classification that is either "quality" or "non-quality". The pre-defined statistical measures may be adjusted and refined over time or based on changing conditions of the learning/training environment.

In Step 504, a quality score is obtained for each of the n-grams, based on the classifications obtained in Step 502. In one embodiment of the present disclosure, the quality score for a particular n-gram is based on the ratio of "quality" predictions by the set of classifiers versus the total number of classifications performed for the n-gram (considering "quality" and "non-quality" outcomes). In other words, for each n-gram, the number of "quality" classifications is obtained (based on satistfying pre-defined statistical measures as described), which is then divided by the total number of classifications performed for the n-gram, resulting in the quality score.

The use of a set of classifiers, as described in FIG. 5, effectively provides a statistical compensation for the possibility of the knowledge base being incomplete (i.e., for the scenario in which an n-gram that is actually meaningful does not appear in the knowledge base). The obtained quality score is, thus, based on a combination of relevance and meaningfulness adjusted for a possibly incomplete knowledge base. If, theoretically, a perfect knowledge base (all meaningful n-grams guaranteed to exist in the knowledge base) is used, one may skip the classification described in FIG. 5, and may instead use the ground truth data (quality/non-quality) as a reliable indicator for meaningfulness.

Figure 6:
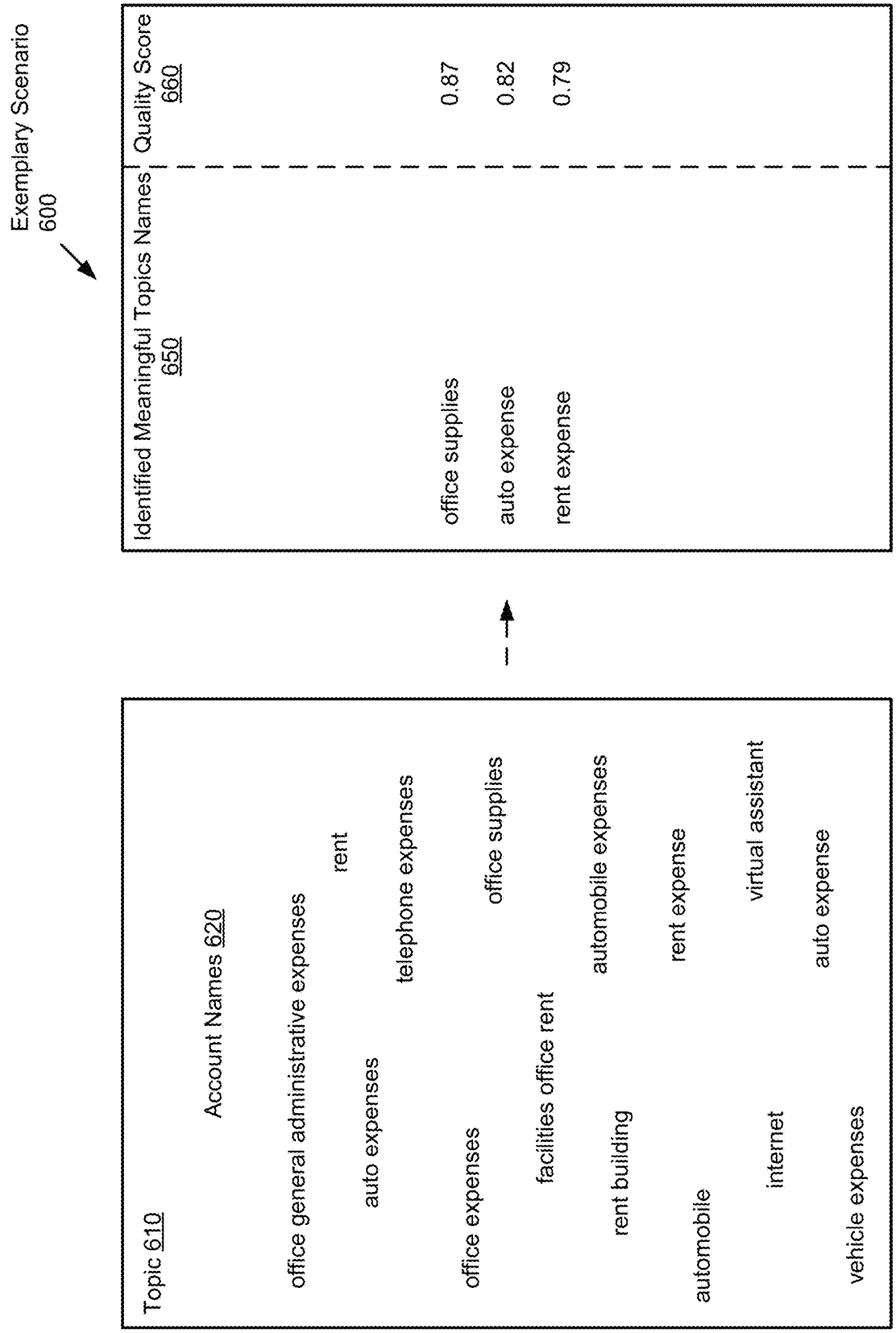
FIG. 6 shows an exemplary generation of a topic name in accordance with one or more embodiments of the invention.

Turning to FIG. 6, an exemplary generation of a topic name, in accordance with one or more embodiments of the present disclosure, is shown. FIG. 6 shows a topic (610) and a selection of account names (620) arranged under that topic. Note that, for simplicity, only a few account names are shown. While not shown, many more account names may actually be grouped under the topic. The account names are directed to various types of expenses, and the methods of FIGS. 3, 4 and 5 are executed in order to identify meaningful topic names. The resulting identified meaningful topic names (650) with their associated quality scores (660) are shown in FIG. 6.

As shown in FIG. 6, the previously described methods, while not limited by the number of categories, have resulted in the detection of three major categories of topic names: "office supplies", "auto expense" and "rent expense". Each of these identified meaningful topic names received a reasonable but not perfect quality score (600). While each of these three identified meaningful topic names, indeed, properly represent some account names, they do not properly represent all account names. For example, the topic name "office supplies" poorly represents the account name "vehicle expenses". Accordingly, the result shown in FIG. 6 serves as an example for an insufficient number of topics selected for the account names to be represented. To properly represent all account names, it is necessary to split the topic (610) into three different topics: one representing office supplies, one representing auto expenses, and one representing rent expenses. Reiterating (e.g., re-running) the methods of FIGS. 3, 4 and 5 on these three separate topics would result in topic names that are representative for all account names under these topics, reflected by a considerably higher quality score.

Various embodiments of the present disclosure have one or more of the following advantages. Embodiments of the present disclosure enable the generation of topic names or tags, to be assigned to topics that are used to group accounts. In one or more embodiments of the present disclosure, a generated topic name is representative for all or at least the majority of account names under the topic. Further, a generated topic name is meaningful, in view of a knowledge base, in accordance with an embodiment of the present disclosure. The generation of a topic name may not require any or very little human operator involvement. Accordingly, the topic name identification may be rapidly performed and may also be re-performed at any time, e.g., when a new account name is added to a topic.

The generated topic name may be beneficial in various ways. For example, the topic name may help users to navigate through the chart of accounts, in particular in organizations that rely on numerous accounts. Topic names may further be suitable as a sanity check to assess whether a reasonable number of topics to represent the accounts of an organization have been established. If too few topics have been established, the topic names may become overly broad, whereas if too many topics have been established, the topic names may become overly narrow. Based on the observed scope of the obtained topic names, the number of topics may therefore be adjusted.

Embodiments of the present disclosure may be implemented on a computing system. Any combination of mobile, desktop, server, router, switch, embedded device, or other types of hardware may be used. For example, as shown in FIG. 7A, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the present disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the present disclosure.

The computing system (700) in FIG. 7A may be connected to or be a part of a network. For example, as shown in FIG. 7B, the network (720) may include multiple nodes (e.g., node X (722), node Y (724)). Each node may correspond to a computing system, such as the computing system shown in FIG. 7A, or a group of nodes combined may correspond to the computing system shown in FIG. 7A. By way of an example, embodiments of the present disclosure may be implemented on a node of a distributed system that is connected to other nodes. By way of another example, embodiments of the present disclosure may be implemented on a distributed computing system having multiple nodes, where each portion of the present disclosure may be located on a different node within the distributed computing system. Further, one or more elements of the aforementioned computing system (700) may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7A. Further, the client device (726) may include and/or perform all or a portion of one or more embodiments of the present disclosure.

The computing system or group of computing systems described in FIGS. 7A and 7B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the present disclosure. The processes may be part of the same or different application and may execute on the same or different computing system.

Rather than or in addition to sharing data between processes, the computing system performing one or more embodiments of the present disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the present disclosure, may extract one or more data items from the obtained data. For example, the extraction may be performed as follows by the computing system in FIG. 7A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query provided to a structured data repository (where the data repository may be organized according to a database schema or data format, such as XML).

The extracted data may be used for further processing by the computing system. For example, the computing system of FIG. 7A, while performing one or more embodiments of the present disclosure, may perform data comparison. Data comparison may be used to compare two or more data values (e.g., A, B). For example, one or more embodiments may determine whether $A>B$, $A=B$, $A !=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., A–B), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the present disclosure, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 7A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 7A may include functionality to provide raw and/or processed data, such as results of comparisons and other processing. For example, providing data may be accomplished through various presenting methods. Specifically, data may be provided through a user interface provided by a computing device. The user interface may include a GUI that displays information on a display device, such as a computer monitor or a touchscreen on a handheld computer device. The GUI may include various GUI widgets that organize what data is shown as well as how data is provided to a user. Furthermore, the GUI may provide data directly to the user, e.g., data provided as actual data values through text, or rendered by the computing device into a visual representation of the data, such as through visualizing a data model.

For example, a GUI may first obtain a notification from a software application requesting that a particular data object be provided within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be provided through various audio methods. In particular, data may be rendered into an audio format and provided as sound through one or more speakers operably connected to a computing device.

Data may also be provided to a user through haptic methods. For example, haptic methods may include vibrations or other physical signals generated by the computing system. For example, data may be provided to a user using a vibration generated by a handheld computer device with a predefined duration and intensity of the vibration to communicate the data.

The above description of functions presents only a few examples of functions performed by the computing system of FIG. 7A and the nodes and/or client device in FIG. 7B. Other functions may be performed using one or more embodiments of the present disclosure.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating a topic name for accounts grouped under a topic, the method comprising:
obtaining account names associated with the accounts;
generating a plurality of n-grams from the account names;
for each n-gram, generating a quality score based on relevance and meaningfulness of the n-gram,
wherein the relevance is determined using at least one relevance score that reflects how representative the n-gram is for the plurality of n-grams, and
wherein the meaningfulness is determined based on whether the n-gram exists in a knowledge base; and
assigning one or more of the n-grams to the topic as the topic name, based on the quality score generated for each of the plurality of n-grams, wherein assigning comprises one selected from the group consisting of:
assigning the n-gram with a highest quality score to the topic as the topic name,
assigning a plurality of n-grams associated with quality scores above a threshold to the topic as the topic name, and
assigning a set number of n-grams associated with highest quality scores to the topic as the topic name.

2. The method of claim 1, wherein determining the relevance of the n-gram comprises obtaining at least one statistical measure resulting in the at least one relevance score for the n-gram, based on how relevant the n-gram is in view of all other n-grams of the plurality of n-grams.

3. The method of claim 2, wherein the at least one statistical measure is based on at least one selected from a group consisting of a frequency of the n-gram, a term frequency-inverse document frequency (TF-IDF), and a mutual information.

4. The method of claim 1, wherein determining the meaningfulness of the n-gram comprises:
labeling each of the n-grams as either "quality" or "non-quality", based on whether the n-gram exists in the knowledge base;
obtaining at least one statistical measure resulting in the at least one relevance score for each of the n-grams, based on how relevant the n-gram is in view of all other n-grams of the plurality of n-grams;
training classifiers using the statistical measures as features and using the "quality"/"non-quality" labels as ground truth; and
applying the trained classifiers to the n-gram to obtain the quality score.

5. The method of claim 4, wherein the classifiers are based on one selected from a group consisting of logistic regressions, random forests and gradient boost machines.

6. The method of claim 4, wherein the quality score comprises a ratio of predictions by the trained classifiers indicating "quality" and all predictions by the trained classifiers, resulting from applying the trained classifiers to the n-gram.

7. The method of claim 1, wherein the knowledge base comprises expert knowledge in a discipline related to the accounts.

8. The method of claim 1, wherein the knowledge base is one selected from a group consisting of a text document, a spreadsheet, a database, and a web page.

9. A system for generating a topic name for accounts grouped under a topic, the system comprising:
an account repository storing the accounts;
an account identification repository storing account names associated with the accounts;
a hardware processor and memory; and
software instructions stored in the memory, which when executed by the hardware processor, cause the hardware processor to:

obtain the account names associated with the accounts from the account identification repository;
generate a plurality of n-grams from the account names;
for each n-gram, generate a quality score based on relevance and meaningfulness of the n-gram,
wherein the relevance is determined using at least one relevance score that reflects how representative the n-gram is for the plurality of n-grams, and
wherein the meaningfulness is determined based on whether the n-gram exists in a knowledge base; and
assign one or more of the n-grams to the topic as the topic name, based on the quality score generated for each of the plurality of n-grams, wherein the assigning comprises performing one selected from the group consisting of:
assigning the n-gram with a highest quality score to the topic as the topic name,
assigning a plurality of n-grams associated with quality scores above a threshold to the topic as the topic name, and
assigning a set number of n-grams associated with highest quality scores to the topic as the topic name.

10. The system of claim 9, wherein determining the relevance of the n-gram comprises obtaining at least one statistical measure resulting in the at least one relevance score for the n-gram, based on how relevant the n-gram is in view of all other n-grams of the plurality of n-grams.

11. The system of claim 10, wherein the at least one statistical measure is based on at least one selected from a group consisting of a frequency of the n-gram, a term frequency-inverse document frequency (TF-IDF), and a mutual information.

12. The system of claim 9, wherein determining the meaningfulness of the n-gram comprises:
labeling each of the n-grams as either "found" or "not found", based on whether the n-gram exists in the knowledge base;
obtaining at least one statistical measure resulting in the at least one relevance score for each of the n-grams, based on how relevant the n-gram is in view of all other n-grams of the plurality of n-grams;
training classifiers using the statistical measures as features and using the "found"/"not found" labels as ground truth; and
applying the trained classifiers to the n-gram to obtain the quality score.

13. The system of claim 9, wherein the knowledge base comprises expert knowledge in a discipline related to the accounts.

14. The system of claim 9, wherein the knowledge base is one selected from a group consisting of a text document, a spreadsheet, a database, and a web page.

15. A method for generating a topic name for accounts grouped under a topic, the method comprising:
obtaining account names associated with the accounts;
generating a plurality of n-grams from the account names;
for each n-gram, generating a quality score based on relevance and meaningfulness of the n-gram,
wherein the relevance is determined using at least one relevance score that reflects how representative the n-gram is for the plurality of n-grams,
wherein the meaningfulness is determined based on whether the n-gram exists in a knowledge base, and
wherein determining the meaningfulness of the n-gram comprises:
labeling each of the n-grams as either "quality" or "non-quality", based on whether the n-gram exists in the knowledge base;
obtaining at least one statistical measure resulting in the at least one relevance score for each of the n-grams, based on how relevant the n-gram is in view of all other n-grams of the plurality of n-grams;
training classifiers using the statistical measures as features and using the "quality"/"non-quality" labels as ground truth; and
applying the trained classifiers to the n-gram to obtain the quality score; and
assigning one or more of the n-grams to the topic as the topic name, based on the quality score generated for each of the plurality of n-grams.

16. The method of claim 15, wherein determining the relevance of the n-gram comprises obtaining at least one statistical measure resulting in the at least one relevance score for the n-gram, based on how relevant the n-gram is in view of all other n-grams of the plurality of n-grams.

17. The method of claim 16, wherein the at least one statistical measure is based on at least one selected from a group consisting of a frequency of the n-gram, a term frequency-inverse document frequency (TF-IDF), and a mutual information.

18. The method of claim 16, wherein the classifiers are based on one selected from a group consisting of logistic regressions, random forests and gradient boost machines.

19. The method of claim 16, wherein the quality score comprises a ratio of predictions by the trained classifiers indicating "quality" and all predictions by the trained classifiers, resulting from applying the trained classifiers to the n-gram.

20. A system for generating a topic name for accounts grouped under a topic, the system comprising:
an account repository storing the accounts;
an account identification repository storing account names associated with the accounts;
a hardware processor and memory; and
software instructions stored in the memory, which when executed by the hardware processor, cause the hardware processor to:
obtain the account names associated with the accounts from the account identification repository;
generate a plurality of n-grams from the account names;
for each n-gram, generate a quality score based on relevance and meaningfulness of the n-gram,
wherein the relevance is determined using at least one relevance score that reflects how representative the n-gram is for the plurality of n-grams, and
wherein the meaningfulness is determined based on whether the n-gram exists in a knowledge base;
wherein determining the meaningfulness of the n-gram comprises:
labeling each of the n-grams as either "found" or "not found", based on whether the n-gram exists in the knowledge base;
obtaining at least one statistical measure resulting in the at least one relevance score for each of the n-grams, based on how relevant the n-gram is in view of all other n-grams of the plurality of n-grams;
training classifiers using the statistical measures as features and using the "found"/"not found" labels as ground truth; and applying the trained classifiers to the n-gram to obtain the quality score; and assign one or more of the n-grams to the topic as the topic name, based on the quality score generated for each of the plurality of n-grams.

21. The system of claim 20, wherein determining the relevance of the n-gram comprises obtaining at least one statistical measure resulting in the at least one relevance score for the n-gram, based on how relevant the n-gram is in view of all other n-grams of the plurality of n-grams.

22. The system of claim 21, wherein the at least one statistical measure is based on at least one selected from a group consisting of a frequency of the n-gram, a term frequency-inverse document frequency (TF-IDF), and a mutual information.

23. The system of claim 20, wherein the knowledge base comprises expert knowledge in a discipline related to the accounts.

\* \* \* \* \*